Figure 1:
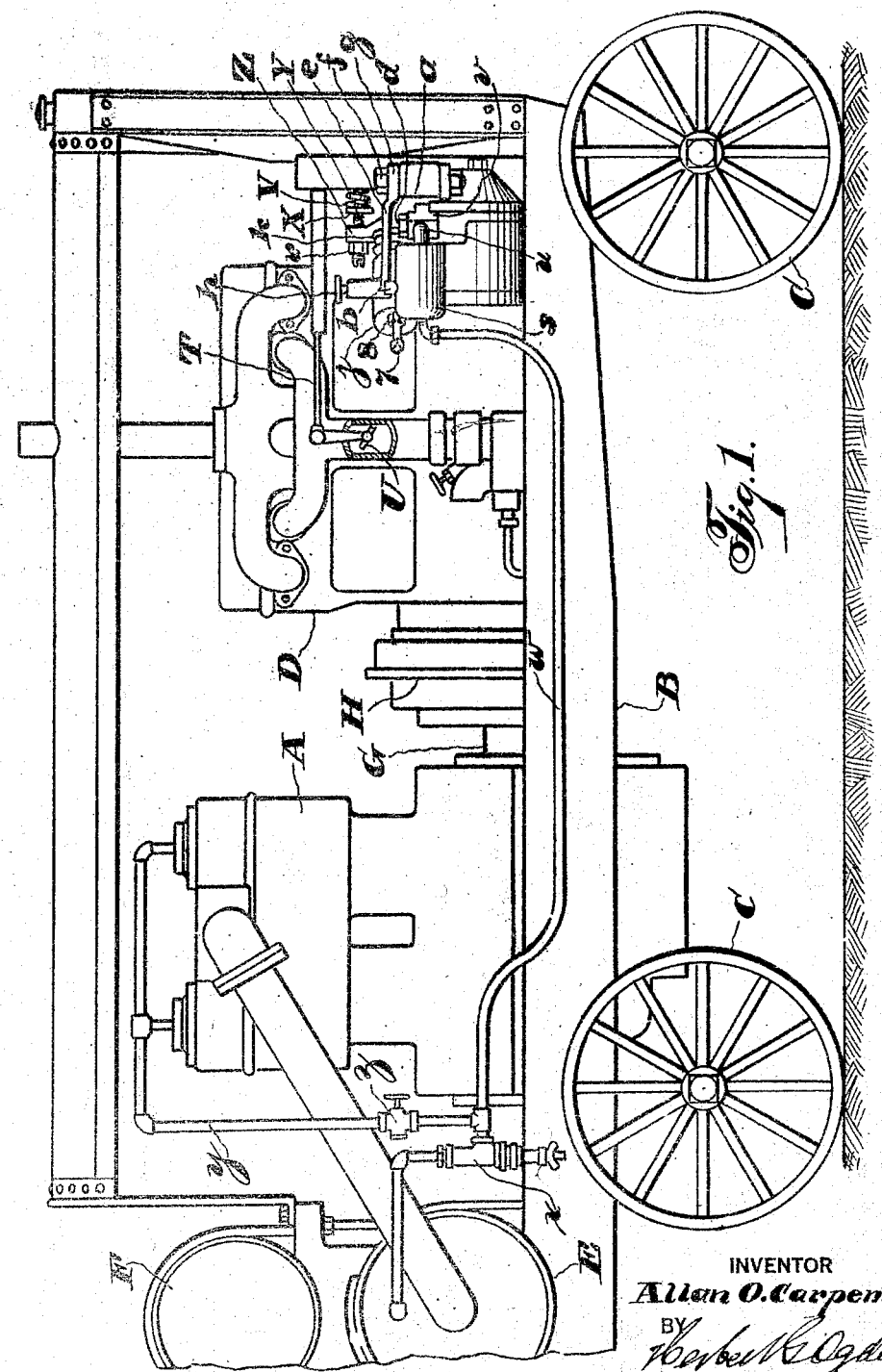

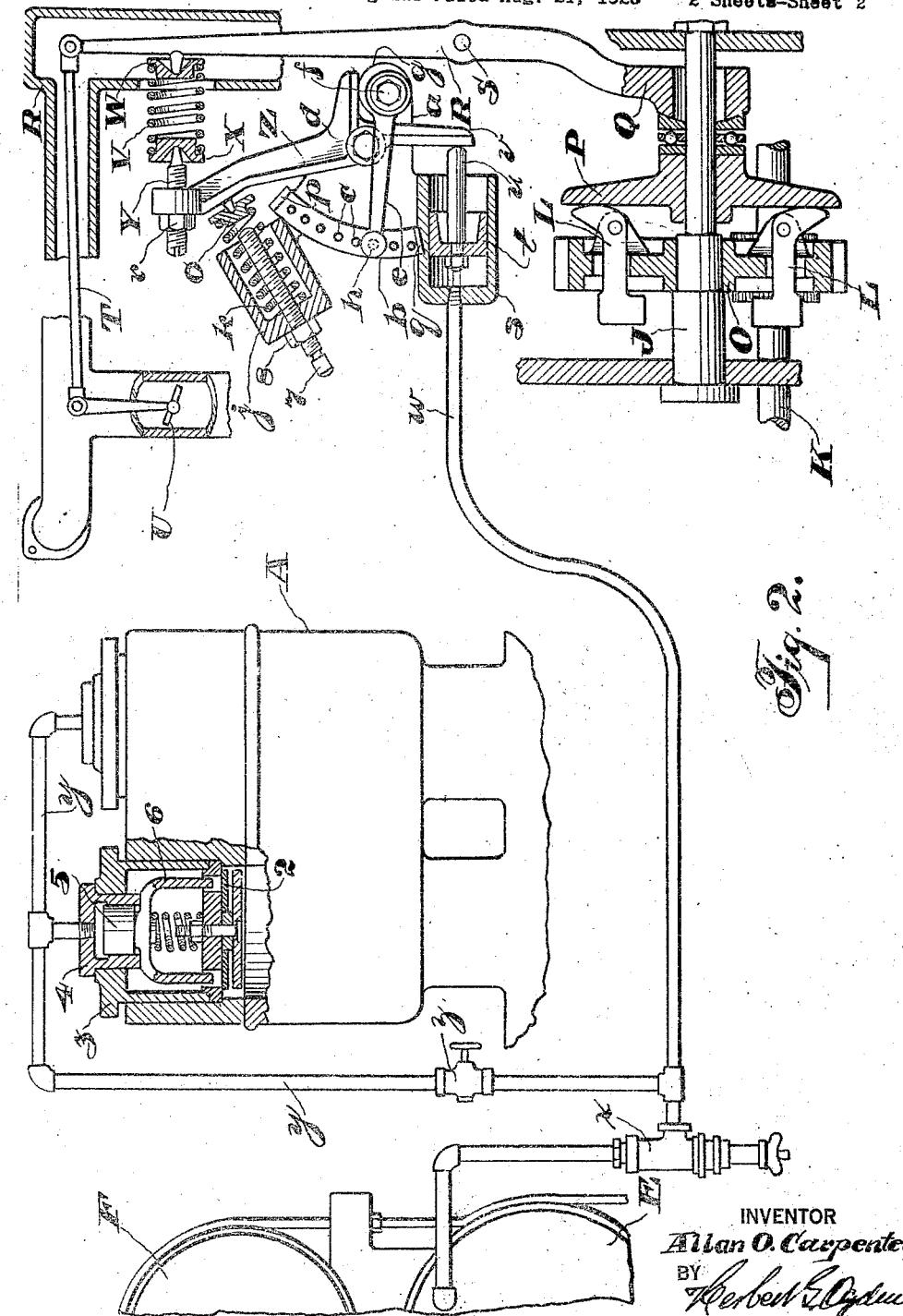

Patented Aug. 25, 1925.

1,550,876

UNITED STATES PATENT OFFICE.

ALLAN O. CARPENTER, OF CORNING, NEW YORK, ASSIGNOR TO INGERSOLL-RAND COMPANY, OF JERSEY CITY, NEW JERSEY, A CORPORATION OF NEW JERSEY.

GOVERNOR CONTROLLER FOR INTERNAL-COMBUSTION ENGINES.

Original application filed August 21, 1923, Serial No. 658,598. Divided and this application filed July 5, 1924. Serial No. 724,243.

*To all whom it may concern:*

Be it known that I, ALLAN O. CARPENTER, a citizen of the United States, residing in Corning, county of Steuben, State of New York, have invented a certain Governor Controller for Internal-Combustion Engines, of which the following is a specification accompanied by drawings.

This application is a division of my co-pending application Serial No. 658,598, filed August 21, 1923, for governor controller for internal combustion engines.

This invention relates to controlling mechanism for the governor of an internal combustion engine, but particularly to mechanism for controlling the centrifugal governor of such an engine when used for driving a compressor.

In an ordinary combustion engine driven unit, even although equipped with a governor for the engine, the unit is operated at practically a constant speed and when unloading of the compressor takes place there is a slight increase in the speed of the unit, due to reduced load. Furthermore, it is not convenient to reduce the speed of the machine during operation in order to cut down the amount of air delivered in accordance with the demands, since this must be done by regulation of the hand throttle of the engine.

Such regulation takes the machine out of governor control as long as air is being compressed, and if the engine has been throttled to a low speed and unloading occurs, the engine will immediately jump to its maximum speed as controlled by the governor. Also, when operating under the throttled condition and without governor control, even though unloading does not occur, the operation is likely to be more or less unsteady, due to variations in the fuel supply and the other operating conditions.

The objects of the present invention are to enable the machine to be maintained under governor control at any operating speed, and when automatically unloaded to be automatically reduced in speed to a minimum idling speed, but even in this condition still maintained under governor control. The advantages of such operation are among others mentioned, that at no times is the machine running at an excessive speed, which greatly reduces the wear on the moving parts and reduces the fuel consumption. In addition to the features mentioned an object of the invention is to enable the operator to conveniently and promptly adjust the governor setting, whereby the operating speed of the machine may be reduced through successive steps to a predetermined minimum while the engine is running.

The invention is shown in one of its preferred forms in the accompanying drawings, in which—

Figure 1 is a side elevation of a gasoline engine driven portable compressor unit equipped with a governor controlling mechanism, and Figure 2 is an enlarged detail diagrammatic view of the governor controlling mechanism partly in section, with the relative position of some of the parts altered and brought into the same vertical plane for clearness of illustration.

Referring to the drawings, the invention is shown in connection with a portable compressor unit, in which the compressor A, mounted on the frame B having the wheels C, is driven by any suitable combustion engine D. The invention, however, is applicable to stationary as well as portable units. The air receiver E for the compressor, and gasoline tank F for the combustion engine, may be mounted in any suitable manner on the frame. The main driving shaft of the combustion engine D and the crank shaft G of the compressor, are coupled by any suitable coupling H.

The combustion engine is provided with a suitable centrifugal governor mounted on the countershaft J suitably geared to the engine shaft K. The weighted governor arms L, in this instance, are pivoted on the spider O and are adapted to bear against the plate P, slidable on the countershaft J, which in turn moves the lower end Q of the governor lever R outwardly about the pivotal point S as the governor arms fly outwardly with increase of speed of the engine. The upper end of the lever R is connected by a rod T to the throttle U of the combustion engine, so that upon an increase of speed of the engine beyond a predetermined degree, the throttle U is automatically moved towards closed position and the speed brought back to the desired point.

Means are provided for setting the governor whereby the speed of the engine may be limited to a predetermined maximum and in this instance a compression spring V is held between the cap W on the lever R and the cap X on the end of the adjusting set screw Y, which in turn is mounted on a controller arm Z. The tension of the governor spring V determines the maximum speed of the engine.

In accordance with one feature of the invention, means are provided cooperating with the said setting device for reducing the operating speed of the engine through successive steps to a predetermined minimum, and this cooperating means is perferably manually operated.

In the present instance, and as a convenient form of unitary governor controller adapted to be mounted on the combustion engine, a controller bracket $a$ is provided with an adjusting segment $b$ having a series of holes $c$ corresponding to different speeds of the engine, and the controller arm Z carrying the set screw or adjusting device Y is pivoted at $d$ on the bracket $a$. The controller lever $e$ is pivoted on the bracket $a$ at the point $f$, and is provided with a cam $g$ cooperating with portions of the controller arm. A spring pin $h$ in the outer end of the controller lever $e$ is adapted to be inserted in the holes $c$ in the segment $b$ to maintain the controller lever $e$ in the desired position for a given speed of the engine. The bracket $a$ is also provided with a spring pocket or socket $j$ containing a spring $k$ having a cap $o$ bearing upon the controller arm Z, which tends to hold the controller arm upon the cam $g$ of the controller lever $e$. When the controller lever $e$ is adjusted nearest the end $p$ of the segment $b$, the governor spring V will be under maximum compression and the speed of the engine will be limited to a predetermined maximum. From this setting the controller lever $e$ may be moved towards the opposite end $q$ of the segment $b$ and adjusted in different holes $c$ for reducing the operating speed of the engine through successive steps to a predetermined minimum, because in so moving the controller lever $e$ the controller arm Z will be adjusted by the cam $g$ to relieve the compression of the governor spring V, and a predetermined minimum speed of the engine will be obtained when the controller lever $e$ is in the last hole $c$ nearest the end $q$ of the segment. By loosening the adjusting nut $r$ on the set screw Y of the governor setting device and adjusting the set screw Y, the tension of the spring V may be varied and the predetermined speed for which the governor is set may be changed.

In addition to the manual means for reducing the operating speed of the engine through successive steps to a predetermined minimum, automatic mechanism is also provided cooperating with the setting device for reducing the operating speed of the engine to a predetermined minimum, which may be equal to or below the minimum speed determined by the manual levers. This automatic mechanism is preferably operated in accordance with the discharge pressure of the compressor and is intended to be brought into operation when the air discharge pressure exceeds a predetermined degree or when the compressor is running unloaded. For this purpose the controller bracket $a$ is preferably provided with an air cylinder $s$, having a plunger $t$ carrying a pin $u$ adapted to bear against the toe $v$ of the controller arm Z, so that air pressure behind the plunger $t$ will force the pin $u$ against the toe $v$ and rock the controller arm Z about its pivot $d$ in a direction to relieve the tension of the governor spring V, regardless of the position at which the controller lever $e$ is set. As shown, the air cylinder $s$ is connected by a pipe $w$ through any suitable auxiliary valve $x$ to the receiver tank E. The function of the auxiliary valve $x$ is like that of the valve described in United States Patent No. 1,138,278 granted May 4, 1915, to J. H. Castle and W. G. Rogers. A branch pipe $y$ preferably having a check valve $z$ is connected to the pipe $w$ to furnish fluid pressure for holding open the inlet valves of the compressor to permit unloading. The inlet valves (only one of which is shown) may be of any suitable construction, and in this instance are shown as plate valves 2, having valve cages 3 provided with air cylinders 4 having plungers 5 and fingers 6 connected to the plungers for lifting and holding the valves open when air pressure is admitted behind the plungers. Upon a sufficient increase of pressure in the discharge tank E, the auxiliary valve $x$ will permit fluid pressure to pass to the said valve lifters and also to the air cylinder $s$ of the governor controller, in which case the compressor will be automatically unloaded and the engine speed will be automatically reduced to a predetermined degree, while the compressor is running unloaded. The compressor will automatically resume its load at the proper pressure, and the engine will be brought back to operating speed.

Means are also provided in connection with the governor controller for setting the automatic mechanism so that the minimum speed of the engine will be adjusted to any predetermined limit, and for this purpose a minimum speed stop in the form of a set screw 7, having the adjusting nut 8, extends into the spring socket $j$ and forms a stop for the cap $o$ which bears against the controller arm Z. By adjusting the set screw 7 the movement of the controller arm Z may be limited as desired for adjusting the minimum speed of the engine.

I have found that my governor controller operates satisfactorily and well and in a highly efficient manner. When the various adjustments are once made they need not be altered under ordinary conditions, but may be readily changed if desired. The automatic mechanism will operate under the conditions required for such operation and the manual adjusting device may be readily and conveniently adjusted while the engine is running, which is an important feature in addition to the advantages hereinbefore pointed out.

I claim:

1. In a compressor unit, the combination of a compressor and an internal combustion engine, and a governor controller for the internal combustion engine, comprising a centrifugal governor, a device for setting the governor whereby the speed of the engine may be limited to a predetermined maximum, manual means cooperating with said setting device for reducing the operating speed of the engine through successive steps to a predetermined minimum, and automatic mechanism controlled by the discharge pressure of the compressor and cooperating with said setting device for reducing the operating speed of the engine to a predetermined minimum.

2. In a compressor unit, the combination of a compressor and an internal combustion engine, and a governor controller for the internal combustion engine, comprising a spring controlled centrifugal governor, a device for adjusting the tension of the governor spring whereby the speed of the engine may be limited to a predetermined maximum, manual means cooperating with said adjusting device for reducing the operating speed of the engine through successive steps to a predetermined minimum, and automatic mechanism controlled by the discharge pressure of the compressor and cooperating with said setting device for reducing the operating speed of the engine to a predetermined minimum.

3. In a compresor unit, the combination of a compressor and an internal combustion engine, and a governor controller for the internal combustion engines, comprising a centrifugal governor, a device for setting the governor whereby the speed of the engine may be limited to a predetermined maximum, manual means cooperating with said adjusting device for reducing the operating speed of the engine through successive steps to a predetermined minimum, automatic mechanism controlled by the discharge pressure of the compressor and cooperating with said setting device for reducing the operating speed of the engine to a predetermined minimum, and means for setting the said automatic mechanism whereby the minimum speed of the engine may be adjusted to any predetermined limit.

4. In a compressor unit, the combination of a compressor and an internal combustion engine, and a governor controller for the internal combustion engine, comprising a centrifugal governor, a device for setting the governor whereby the speed of the engine may be limited to a predetermined maximum and combined manual and automatic means cooperating with said setting device for varying said setting, said automatic means being controlled by the discharge pressure of the compressor.

5. A governor controller for the internal combustion engines, comprising a centrifugal governor, a spring pressed governor lever, a device for setting the governor whereby the speed of the engine may be limited to a predetermined maximum and both manual and automatic devices for independently controlling said setting device, said automatic device being controlled by the discharge pressure of the compressor, and means for setting the said automatic device whereby the minimum speed of the engine may be adjusted to any predetermined limit.

In testimony whereof I have signed this specification.

ALLAN O. CARPENTER.